Feb. 21, 1950    M. KAPLOWITZ    2,498,278
HOLDER FOR LIGHT-CONTROL DEVICES
Filed July 23, 1947    3 Sheets-Sheet 1
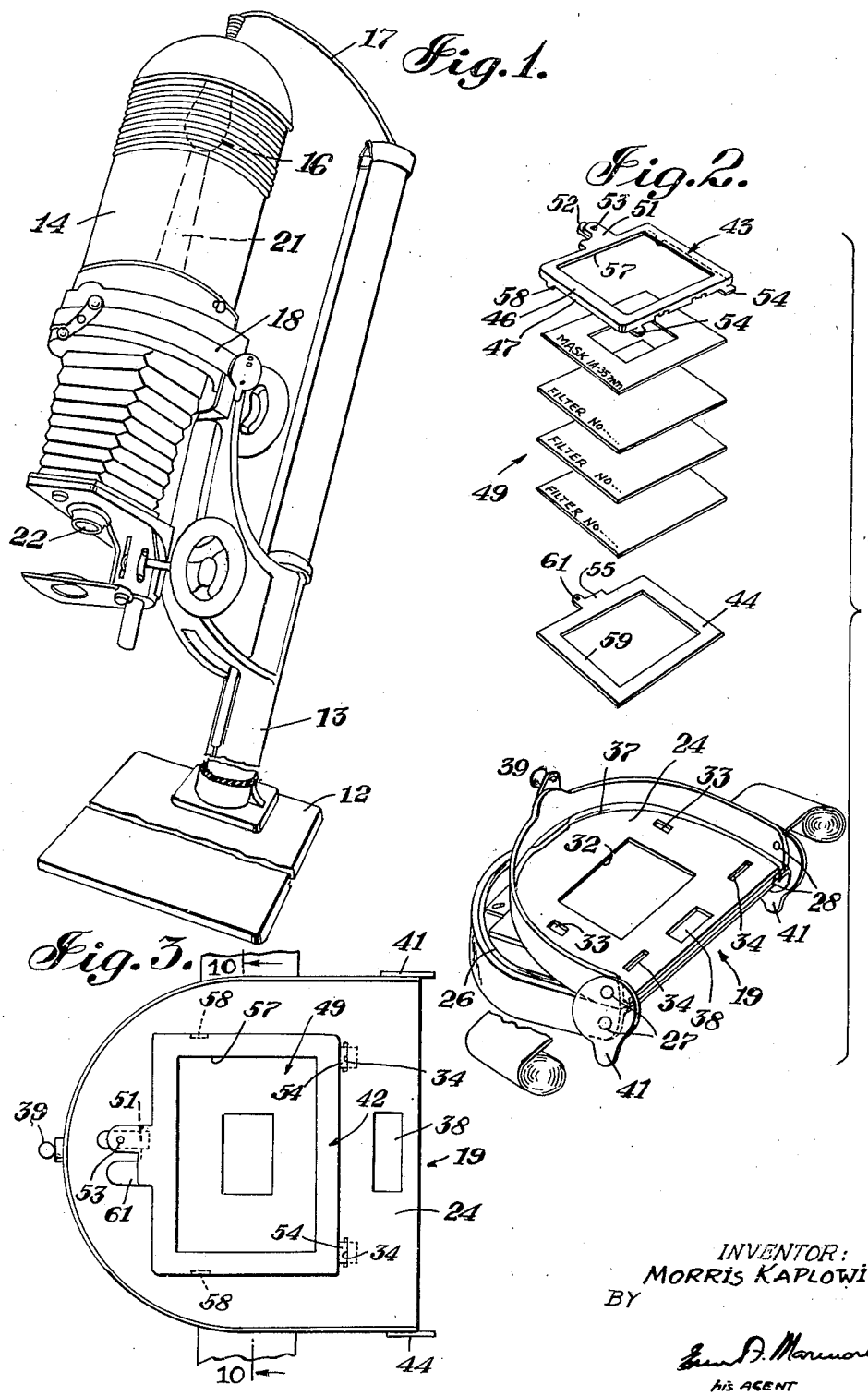
INVENTOR:
MORRIS KAPLOWITZ
BY
HIS AGENT Feb. 21, 1950 M. KAPLOWITZ 2,498,278
HOLDER FOR LIGHT-CONTROL DEVICES
Filed July 23, 1947 3 Sheets-Sheet 2

INVENTOR:
MORRIS KAPLOWITZ
BY
his AGENT

Feb. 21, 1950 M. KAPLOWITZ 2,498,278
HOLDER FOR LIGHT-CONTROL DEVICES
Filed July 23, 1947 3 Sheets-Sheet 3

INVENTOR:
MORRIS KAPLOWITZ
BY
his AGENT

Patented Feb. 21, 1950

2,498,278

UNITED STATES PATENT OFFICE 2,498,278

HOLDER FOR LIGHT-CONTROL DEVICES

Morris Kaplowitz, New York, N. Y., assignor to Federal Manufacturing & Engineering Corp., a corporation of New York Application July 23, 1947, Serial No. 762,947

4 Claims. (Cl. 88—24)

The invention relates to optics and relates more particularly to optical projection equipment.

One of the principal objects of the invention is the provision of a carrier for transparent pictures to be received by an optical projector for projecting an image of the picture.

Another object of the invention is to provide a holder for light control devices to cooperate with such a picture carrier for optically controlling the light beam passing through the carrier.

Another object of the invention is to provide such a holder which may be detachably fastened to the picture carrier.

Another object of the invention is the provision of a single unit composed of a carrier and a holder for light control devices cooperating in the projection of a picture within an optical projector.

A further object of the invention is the provision of such a unit that is light in weight and easy to manipulate.

A further object of the invention is to provide a holder for light control devices that is simple in construction.

A still further object of the invention is the provision of a holder for light control devices that may be positioned on a picture carrier so that the devices may be in optical register with the picture, but out of focus therewith.

Further objects and advantages of the invention will be set forth in part in the following specification and in part will be obvious therefrom without being specifically referred to, the same being realized and attained as pointed out in the claims hereof.

With the above and other objects of the invention in view, the invention consists in the novel methods, construction, arrangement and combination of various devices, elements and parts, as set forth in the claims hereof, one embodiment of the same being illustrated in the accompanying drawings and described in the specification.

Projection equipments, particularly for transparent pictures, for instance, for enlarging photographic negatives, require a carrier to support the negative in optical alignment with the light beam within the projector, so that light may pass through the picture and project an image thereof on a projection surface.

In addition, it is often desirable to insert between the picture and the light source various light-control devices, such as filters to absorb certain light rays and permit the passage of others to the picture, or masks to limit the sideward extension and contour of the light beam reaching the picture. Furthermore, it may be necessary to have filters as well as masks simultaneously employed for controlling the light beam. Photographic enlargers and other projectors are often provided with a gate and adjoining seat to receive and hold a picture carrier in position in register with the light beam.

In order to accommodate light-filters and/or masks, enlargers are often provided with a separate, second gate and seat or similar separate means to receive these light-control devices between the light source and the carrier emplacement.

That arrangement has several disadvantages. It is apparent that light rays may escape through the second gate, particularly during projections where no light-control devices are used. Other disadvantages are that the cost of making the projector is increased; furthermore, the position of a mask in such an arrangement is usually too far out of focus with the picture of the carrier so that the outline of the mask opening does not appear sufficiently clearly outlined in the projection.

The present invention is intended to overcome these deficiencies by positioning a holder for light-control devices sufficiently near the carrier, so that the devices will be automatically in register with the picture, permitting a clear outline of the mask opening to appear in projection, though the devices are out of focus with the picture.

For a fuller understanding of the nature and objects of the invention, reference should be had to the following detailed description, taken in connection with the accompanying drawings, in which:

Fig. 1 is a perspective view of a photographic enlarger;

Fig. 2 is an extended perspective view of a negative carrier and a holder containing a mask and a series of filters;

Fig. 3 is a top view showing a carrier in elevation having a holder for light-control devices on its upper surface;

Figure 4:
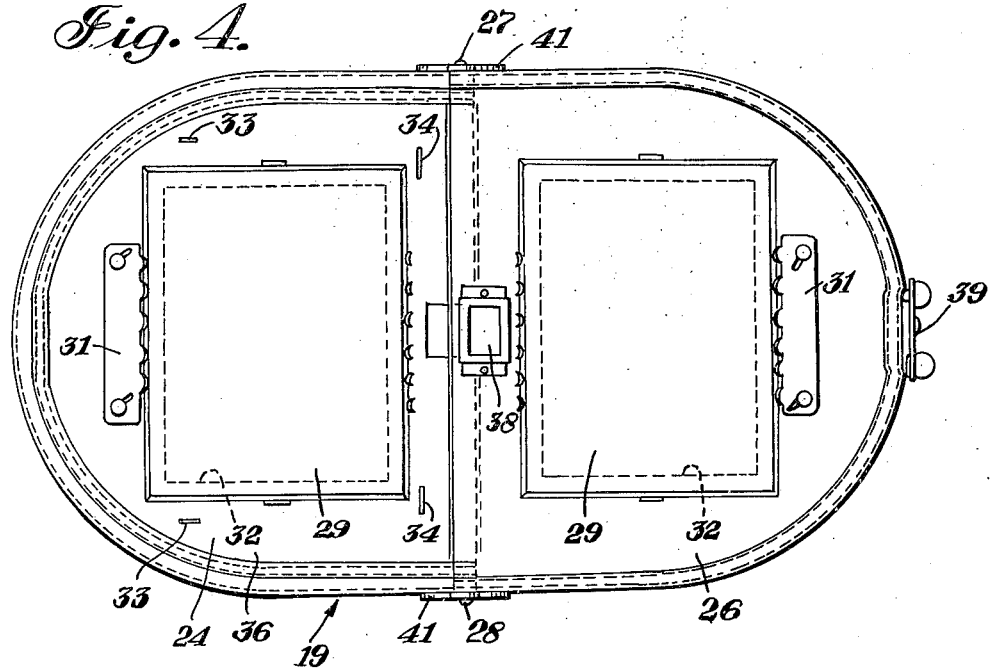
Fig. 4 is a top view of a negative carrier in open, unfolded position.
Figure 5:
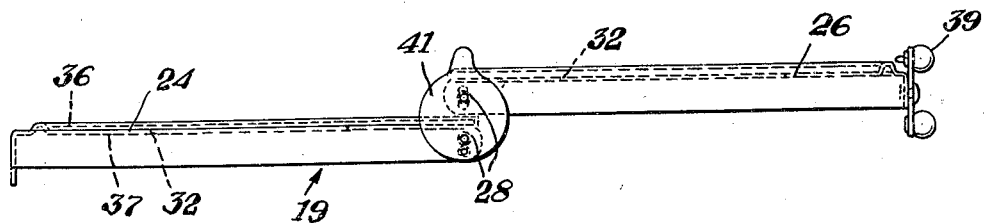
Fig. 5 is a front elevational view of the carrier shown in Fig. 4, but without glass plates or focusing target.

In carrying the invention into effect in one of the embodiments which has been selected for illustration in the accompanying drawings and for description in this specification, and referring now particularly to Fig. 1, a photographic enlarger, generally designated 11 is provided, that comprises a baseboard 12, a support 13 projecting perpendicularly from said baseboard, and a head 14 that is movable vertically on said support 13. Said head 14 carries on its inside a light source 16 that is connected to an electric cord 17 for interconnecting said light source to an electric network. At a distance spaced from said light source 16, said head has a slot 18 to receive and to support a carrier 19 in optical register with said light source, so that a light beam 21 emanating from said light source may pass through said carrier 19 and project a picture contained therein through a lens 22 and finally on to the baseboard 12. A lamp housing 23 encloses the light source 16 and the space between the same and the slot 18.

Said carrier 19, as shown most clearly in Figs. 2, 4, 5, and 10, is composed of two hinged plates, an upper plate 24 and a lower plate 26 hinged together at 27 and 28.

In this exemplification the projector has been assumed to be an enlarger of the upright type supporting the carrier 19 in substantially a horizontal position; but it will be understood that the invention is equally adaptable with other projector types, supporting the carrier in a different position from the horizontal. Since, however, the invention is explained herein in connection with an upright projector, the terms upper plate and lower plate are used, but with the understanding that this is done for the purpose of explanation only.

To each of said plates 24 and 26 is detachably secured a transparent negative pressure plate 29, for instance, a glass plate. When said carrier 19 is closed, the picture is held between the surfaces of the glass plates 29. Each glass plate 29 is detachably held on the respective upper or lower plate by means of a slidable ledge 31 which engages the beveled edge of the glass plate 29. Each glass plate 29 is located on the plate to cover a rectangular light passage 32 in each plate of the carrier. Through this arrangement the picture is held in spaced relationship from the outer surface of each of said plates and the light is permitted to pass through the passage 32 and the glass pressure plates 29 to project the picture, when the carrier is closed and placed in the enlarger 11.

Figure 10:
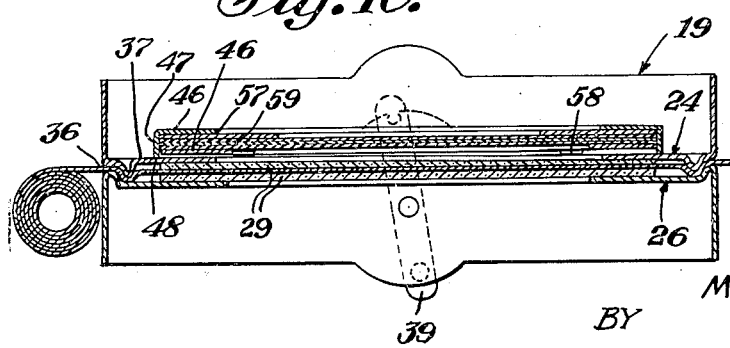
Fig. 10 is a sectional view taken along line 10—10 of Fig. 3.

The carrier 19 is normally in closed or folded position, as best shown in Fig. 10, carrying the picture therebetween. However, in Figs. 4 and 5 the carrier is shown unfolded to permit inspection of the parts thereof, some of the parts shown in Fig. 4 having been left off in Fig. 5.

The upper plate 24 is provided, near the contour of the rectangular light passage 32, with two slots or positioning elements 33 that are parallel with each other and oppositely arranged with relation to the passage 32. Furthermore, there are also two slots 34 in said plate 24 to provide a latching element for a purpose disclosed hereinafter, said slots 34 being in alignment and near one longitudinal edge of the passage 32 and adjacent the hinges 27 and 28, respectively. Each of said slots 33 and 34 extends throughout the thickness of said plate 24, from the interior surface 36 thereof to the outer or upper surface 37 of the same.

The lower plate 26 carries on its interior surface a focusing target 38 that is permanently secured thereto and is spaced from said plate 26 for a distance equal to the thickness of said glass 29, thereby providing the focusing target 38 with the same focus as the picture held between the glasses 29, in relation to the light source of the enlarger.

The focusing target 38 is located intermediate the hinge points 27 and 28 and permits focusing when the carrier 19 is being inserted in the gate 18 for a portion only, before the picture is in optical alignment with the beam. After focusing of the enlarger has been carried out with the aid of the focusing target, the carrier 19 may be moved entirely into the gate 18, and the picture in the carrier will automatically be in focus.

The carrier 19 is furthermore provided with a manually operable wedging device 39 permitting a slight angular spacing of the upper plate 24 from the lower plate 26 to move the picture within the carrier, even after the latter has been fully inserted into the gate 18 of the enlarger 11. Each of said hinge points 27 and 28 comprises a flange 41, each provided with a downward extension that is adapted to cooperate with a recess (not shown in the drawing) in the gate 18 of the enlarger. This arrangement permits insertion of the carrier 19 into the slot only when the former is in its correct position, namely the plate 24 disposed above the plate 26, to avoid erroneous insertion of the carrier, and is controlled by these extensions of the flanges 41 that block an insertion of the vertically reversed carrier.

In order to improve the qualities of photographic enlargements, it is desirable and often necessary to control the light rays passing through the photographic negative held in the negative carrier 19, either by filtering the light rays or by masking the lateral extension of the beam 21. Usually it is necessary to combine masks with filters for controlling the light.

Certain papers for photographic prints, particularly for color photography and for use with variable contrast paper, require the use of specific filters for properly making high-class enlargements, and the manufacturers of photographic paper indicate the type filters that should be used with a particular grade of paper. In addition to this required filter, one or more other filters may be used, in accordance with the judgment of the user based on the particular negatives or transparencies, to impart a desired shade or other qualities to the final enlarged prints. These type filters are conventionally provided with a number, so that for a particular paper and desired qualities the correct filters may be selected and used in superposition for controlling the light beam.

Furthermore, special transparent auxiliary light control devices may be used, for instance of the type carrying outlines of clouds or similar designs to provide a background on the final enlarged print.

Most of the transparent light-control devices are very thin to restrain to a minimum the absorption of those light rays which are desired to pass therethrough. In consequence, to give the best results, they should be held flat and perpendicular to the optical axis of the light beam when used in connection with the picture. Furthermore, in many instances the devices should preferably be held in close superposition to avoid space therebetween, since in such spaces light reflections and consequent aberrations may occur.

There is a further requirement that these light-control devices be placed near the picture and accurately parallel thereto, but out of focus therewith, so that the background or masking will not appear as sharp as the enlarged reproduction itself, as is desired for good enlargements, and to keep the filters away from the heat of the lamp, as most of these filters are made of gelatine films.

Figure 6:
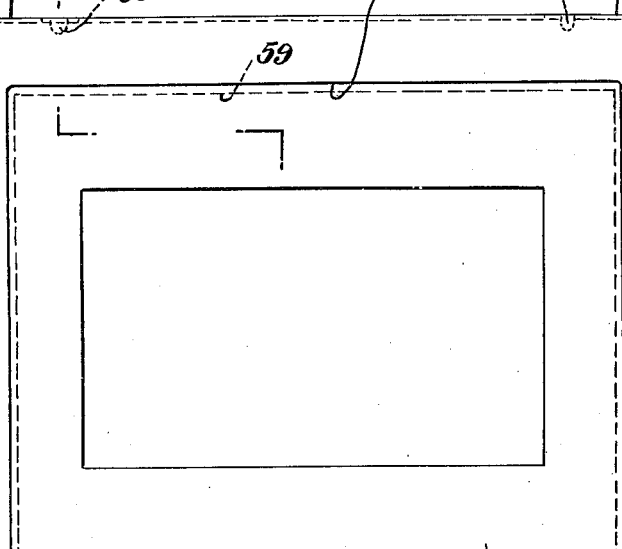
Fig. 6 is a top view showing a holder of light-control devices.

To fulfill these requirements, in accordance with the invention, a holder for light-control devices is provided, and the holder is generally designated 42. Said holder comprises an outer plate or cover 43 and an inner plate or cover 44 designed to hold one or more light-control devices therebetween. Said outer plate 43, as best shown in Figs. 2 and 6, comprises a base 46 of substantially rectangular outline. A flange 47, integral with said base 46, surrounds a major portion of the contour of said base and projects perpendicularly downwardly therefrom and ends in an edge 48 that is parallel with said base 46. Said base 46 and said flange 47 provide a chamber 50 for receiving light-control devices 49 and said inner plate 44 in parallel relationship with said base 46.

At one of the longitudinal edges of said base 46 an extension 51 is connected to said base 46 and is integral therewith. A latch 52 is pivoted to said extension 51 by means of a rivet 53 or by other suitable pivoting means.

Figures 7, 8:
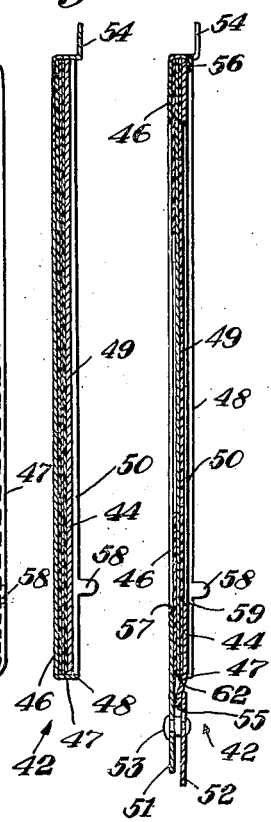
Fig. 7 is a sectional view taken along line 7—7 of Fig. 6.
Fig. 8 is a sectional view taken along line 8—8 of Fig. 6.
Figure 9:
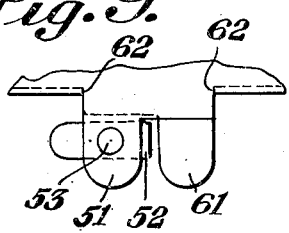
Fig. 9 is a fragmentary elevational view showing a latch detail of Fig. 6, but in closed position.

Near the opposite longitudinal edge there are two positioning lugs 54 connected to the edge 48 of said flange 47; these lugs 54 are Z-shaped and spaced from each other and are integral with said flange. These lugs 54 extend for a portion downwardly and are thence bent outwardly with relation to the center of said base 46 and parallel with said base. Intermediate said two lugs 54, two holding fingers 56 are secured near the longitudinal edge of said lugs 54. These fingers 56, as best shown in Fig. 7, are spaced and each near a lug 54 and each is bent inwardly into said chamber 50 within a cut-out of said flange 47. Said base 46 of said cover 43 has a rectangular aperture 57, the contour thereof being substantially parallel with the contour of said base 46; said aperture 57 is similar in contour to said aperture 32 of said carrier 19, as best shown in Fig. 10. The solid portion of said base 46 thus forms with said flange 47 an angular frame surrounding said aperture 57.

Two straight positioning members 58 are spaced from each other and connected to the edge 48 of said flange 47, and each member 58 is located near the side edges of said base 46 not far from the longitudinal edge thereof carrying the extension 51. Said positioning members 58 are parallel and extend downwardly in the direction of extension of said flange 47.

Said positioning lugs 54 have the same width and are spaced for the same distance as said slots 34 of said carrier 19 and are adapted to cooperate therewith, and similarly, said positioning members 58 have the same width and are spaced for the same distance as said slots 33 of said carrier 19 and designed to cooperate therewith, as will be explained later on.

Said cover 44 has a substantially rectangular outer contour comparable to the inner contour of said chamber 50, and has a rectangular aperture 59 that is similar to said aperture 57 of said outer cover 43, but has a slightly smaller contour than the former and is in register therewith when the cover 44 is inserted into said chamber 50.

An extension 61 is provided at one longitudinal edge of said cover 44 and integral therewith and is so located that it will lie adjacent said extension 51 of said outer cover 43, when said holder 42 is assembled.

In assembling the holder 42, the light-control devices are placed in superposition in said chamber 50 of said cover 43 with one of said devices abutting against the surface of said base 46 within said chamber. Upon inserting the devices one longitudinal edge thereof is placed between the base 46 and said two fingers 56 and then placed parallel to said base 45. Then, the cover 44 is placed against the outermost of the superposed devices at an angle to the base 46 and the longitudinal edge opposite said extension 61 is inserted beneath said fingers 56, and finally the cover 44 is tilted parallel to the base, swinging about the fingers 56 that act thus as a hinge for the cover 44, until said extension 61 is received in a cut-out 62 of said flange 46 and will lie adjacent said extension 51 of said cover 43.

In this position the latch 52 may be manually swung about said pivot 53 to engage a shoulder 55 of said cover 44, thereby latching said two covers 43 and 44. The holder 42 is thus held assembled, with the cover 44 secured to the cover 43 by means of said fingers 46 and said latch 52, and the devices 49 held under a certain pressure therebetween. Thereby said devices will be closely adjacent each other and parallel with said base 46.

After said holder 42 has been assembled, said two positioning lugs 54 may be inserted into said slots 34, thereby protruding through said upper plate 24 of said carrier 19 and extending for a portion below and parallel with the inner surface 36 thereof. Then, the edge 48 is brought to abut against said upper surface 37 of said plate 24, and said positioning members 58 are inserted into said slots 33 for accurately positioning said holder on said carrier.

In this position said base 46 of said cover 43 will be substantially accurately parallel with said upper plate 24 of said carrier 19, and the aperture 57 of said cover 43 be in register with said aperture 32 of the carrier 19 (see Fig. 10).

Thus, the light-control devices 49 are held parallel with the picture supported in the carrier but out of focus therewith, as they are spaced from the picture for a distance including the thickness of the glass 29 above the picture and the thickness of said upper plate 24; since the chamber 50 has greater depth than the distance between the fingers 56 and the base 46, the cover 44 will be entirely within said chamber and spaced for a distance from the outer edge 48 of said flange 47; the out-of-focus distance thus also includes the space between the cover 44 and the edge 48 of the flange 47.

When the holder 42 is positioned on the carrier 19, it is held thereon by gravity due to the weight of the holder and the horizontal position of the carrier 19 in the projector. The holder has to be positioned on the carrier before the latter is slid in its place in the gate 18 of the projector.

Certain of the advantages of the invention have already been herein referred to. It may be useful, however, to allude particularly at this point to the great facility provided by the separate device holder assembly forming a compact entity and, when positioned on the carrier, forming a unit therewith. As best shown in Fig. 3, the focusing target is not obstructed by the holder when the latter is in position on the carrier. The holder admits of insertion therein of several light-control devices or of only a single filter or a single mask, as may be desired.

It will be apparent to those skilled in the art that the novel principles of the invention disclosed herein in connection with specific exemplifications thereof will suggest various other modifications and applications of the same. It is accordingly desired that in construing the breadth of the appended claims they shall not be limited to the specific exemplifications of the invention described herein.

Having thus described the invention, what I claim as new and desire to be secured by Letters Patent is as follows:

1. The combination with a carrier of a transparent picture, said carrier disposed substantially horizontally in an upright enlarger for positioning therein the transparent picture and including an upper surface having an aperture therein to permit the passage of light rays to the picture and having a slot adjacent said aperture; of a holder for light-control devices arranged to be detachably mounted on said upper surface for optically aligning said devices with said picture; said holder comprising in combination two apertured plates adapted to hold therebetween light control devices, each plate having an aperture to permit a portion of each device to be exposed for controlling light rays on their path to said picture, and a projecting off-set lip secured to an outer edge of said holder adapted to be inserted in said slot and to extend for a portion below said upper surface and substantially parallel therewith to position said outer edge with relation to said upper surface, the weight of said holder being sufficient to keep the same adjacent said upper surface and to restrain disengagement of said lip from said slot.

2. The combination with a carrier including two opposite plates, each having an aperture and one plate also having a slot near its aperture, said plates adapted to receive a transparent picture therebetween, said carrier including transparent spacers between said plates and said picture and designed to be inserted in an opening of a projector for positioning therein said picture in optical alignment with the beam of a light source thereof; of a holder of light-control devices, said holder adapted to be removably connected to said carrier parallel therewith for positioning said devices between said carrier and said light source in register with the apertures of said carrier plates but out of focus with said picture; said holder comprising a frame having an opening to permit the passage of light and including a flange projecting perpendicularly from the edge thereof, the outer contour of said flange adapted to abut against the exterior surface of one of said carrier plates spacing said frame parallel with said carrier, and said frame providing therewith a chamber for holding said light-control devices, and an off-set lip connected to said flange and arranged to be inserted through said slot for protruding through said carrier plate and extending for a portion alongside the interior surface thereof for positioning said holder on the exterior of said plate, whereby said devices will be in optical register with said carrier apertures and adjacent and parallel with the picture therein but spaced therefrom sufficiently to be out of focus therewith.

3. A holder structure, for use in connection with an apertured negative carrier including a plate having opposite exterior and interior surfaces and a slot therebetween and adapted to receive and to hold a photographic negative adjacent said interior surface, and designed to be inserted in an opening of a projector for positioning the aperture in optical alignment with the beam of a light source thereof, said holder structure adapted to hold at least one light-control device such as a mask, a filter, or the like, and arranged to be removably connected to said exterior surface of said carrier and comprising, in combination: a frame including a plate portion having an opening therein to permit the passage of light and including a flange portion substantially uniformly projecting perpendicularly from the edge of said plate portion, the outer contour of said flange adapted to abut against said exterior surface of said carrier plate for spacing said plate portion substantially parallel from said carrier surface, whereby said frame provides therewith a chamber for holding said light-control device, and an off-set lip connected to said flange and arranged to be inserted through said slot for protruding through said carrier plate and extending for a portion alongside the interior surface thereof for positioning said holder on the exterior of said plate, whereby said device will be in optical register with said carrier apertures and adjacent and parallel with the negative held by said carrier but spaced therefrom sufficiently to be out of focus therewith.

4. In a holder structure for light-control devices, designed to be positioned on the exterior surface of a negative carrier in optical register therewith, said carrier having a series of positioning elements adjacent a light passage, in combination: an inner plate and an outer plate disposed adjacently and adapted to receive light-control devices therebetween, each plate having an aperture in register with the other, said outer plate having a base of substantially the same contour as said inner plate and having a flange along a portion of the contour projecting therefrom beyond the inner plate to provide an abutment for the same and for said devices against sideward movement thereof, the edge of said flange adapted to abut against the surface of said negative carrier when said holder is positioned thereon, a plurality of holding fingers on said outer plate projecting over a portion of the inner plate and spaced therefrom for a small distance, adapted to restrain one part thereof from being removed from its position within the contour of said flange but permitting an opposite part to be moved so that the inner plate may be manually lifted to an angular position with relation to said outer plate for subsequent removal of the inner plate from the outer plate to release said devices, a latch connected to said outer plate and adapted to be shifted manually over a portion of said opposite part of said inner cover, whereby when said latch is applied said inner plate will be immovably fastened to said outer plate to hold said devices therebetween, and a plurality of positioning lugs on said outer plate adapted to cooperate with said elements on said carrier to position said holder structure on said carrier.

MORRIS KAPLOWITZ.

REFERENCES CITED

The following references are of record in the file of this patent:

UNITED STATES PATENTS

| Number | Name | Date |
|---|---|---|
| 1,434,219 | Mengel | Oct. 31, 1922 |
| 1,527,883 | Lare | Feb. 24, 1925 |
| 2,079,048 | Spencer | May 4, 1937 |
| 2,176,625 | Friedman | Oct. 17, 1939 |
| 2,207,211 | Worlatschek | July 9, 1940 |